United States Patent [19]
Dickerson et al.

[11] Patent Number: 5,146,340
[45] Date of Patent: Sep. 8, 1992

[54] IMAGE DATA READING AND PROCESSING APPARATUS

[75] Inventors: Stephen L. Dickerson, Atlanta; Kok-Meng Lee, Marietta, both of Ga.

[73] Assignee: Georgia Tech Research Corporation, Atlanta, Ga.

[21] Appl. No.: 716,266

[22] Filed: Jun. 17, 1991

[51] Int. Cl.[5] .............................................. H04N 5/225
[52] U.S. Cl. .............................. 358/213.27; 358/209; 358/224
[58] Field of Search ................. 358/224, 108, 101, 93, 358/209, 213.27; 901/46, 47

[56] References Cited

U.S. PATENT DOCUMENTS

| | | |
|---|---|---|
| 4,692,806 | 9/1987 | Anderson et al. ................. 358/209 |
| 4,922,337 | 5/1990 | Hunt et al. ...................... 358/106 X |
| 5,060,074 | 10/1991 | Kinugasa et al. ................. 358/224 |

Primary Examiner—Victor R. Kostak
Attorney, Agent, or Firm—Hopkins & Thomas

[57] ABSTRACT

An image reading system observes a field of view and forms electrical signals indicating the presence of objects within the field as to location and movement. After ascertaining the area of the field in which an object is located, the system is speeded up by reading signals outside the area at a high rate of speed and those inside the area at a normal rate of speed.

17 Claims, 3 Drawing Sheets

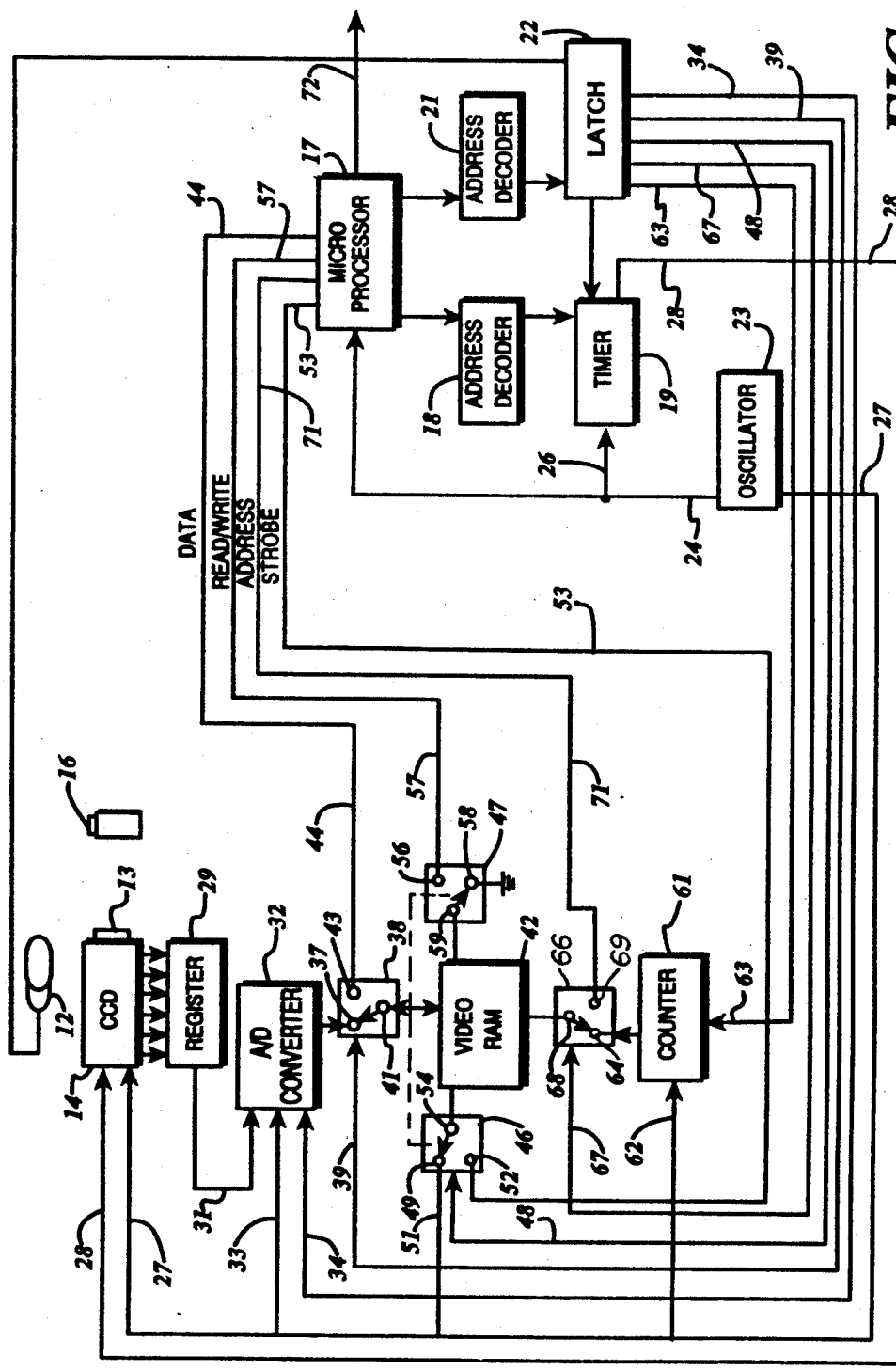

IMAGE DATA READING AND PROCESSING APPARATUS

BACKGROUND OF THE INVENTION

This invention relates to image reading systems, and, more particularly, to an image reading system utilizing a machine or computer vision system.

Machine or computer vision systems generally utilize an array of light sensitive pixels which produce a signal output. When the array is scanned, an analog output pulse train is produced which may subsequently be processed. Subsequent processing generally includes converting the analog signals to digital signals which are then fed to a central processing unit (CPU) for analysis of the data, depending on the functions of the system, which can be numerous and varied. In manufacturing or inspection processes, the image data can be compared to stored calculated geometric or mathematical values as in U.S. Pat. No. 4,697,245 of Kara et al, and any differences represent errors or other aberrations. Thus, a part shape, size, location, or movement can be monitored continuously and any error detected can be used to generate a corrective signal for the making or moving of the items being inspected. For example, in a bakery, the system can be used to monitor the size of loaves of bread. Such an arrangement can even be used to monitor the number of raisins placed in a box of cereal. In metal stamping, the system can be used to inspect part edges, thus gauging the accuracy of the cutting edges of the die, and monitoring die wear.

In most manufacturing processes today, products are produced at a rate that exceeds the ability of humans to inspect precisely by eyeballing. Thus, in a bottling plant, determining the presence and orientation of labels on the bottles is extremely difficult using human visual inspection, because of the speed of movement of the bottles.

The ability to detect and track movement is one of the more useful features of machine or computer vision systems. In U.S. Pat. No. 4,748,502 of Friedman et al there is shown a system for detecting and reading eye movements, for use by physically handicapped people to enable them to communicate. Thus, on a first scan, the cornea and pupil of the eye may be in one position, and for a subsequent scan, in a second, different position. Where the user is reading an alphabet board, for example, having a known configuration, the system is able to correlate the eye position and movement with the letters being looked at, thereby enabling the user to spell out words.

One problem in machine vision systems, regardless of application, is the need for sufficient illumination to enable the array of light sensitive elements to activate. Generally, a form of steady state illumination is used, however, this represents an uneconomical solution to the problem. In U.S. Pat. No. 4,737,857 of Rucci et al, there is shown an arrangement for synchronizing the on/off light source with the optical scan of the device. The Rucci et al arrangement, however, is not typical of prior art vision systems.

Another problem with machine vision systems, especially where used to track moving objects, but also where the item being inspected or checked occupies a very small portion of the frame or raster as defined by the columns and rows of pixels, is the time spent in scanning or reading the entire array, when only a small portion thereof is involved. The Friedman et al patent recognizes the problem, but proposes no implementation of a solution for the problem.

There are numerous applications for machine vision systems, including, in addition to those already discussed, bar code readers and vehicle guidance systems, however, in prior art arrangements the size, complexity, and cost thereof greatly diminish their cost effectiveness.

SUMMARY OF THE INVENTION

The present invention comprises a machine vision system which, as compared to prior art devices, is relatively simple, small, and less costly than units performing substantially the same functions.

The system of the present invention, in a preferred embodiment thereof, comprises a rectangular array of charge coupled detecting devices (CCD) upon which the image being viewed is focused, either by a suitable lens or by a pinhole opening. A microprocessor, under control of an oscillator which sets the frequency standard and synchronization for the entire system, applies at appropriate times a turn-on signal to a latch, which turns on a timer, counter, and analog to digital (A/D) converter. The latch, under control of the microprocessor, activates an illumination device which illuminates the object or field being imaged for a time sufficient to activate the CCD array, then turns the light source off. In order that a reference point or points may be defined, one or more retro-reflective spots or other fiducial marks may be included in the field which is illuminated by the light source.

The timer, under control of the microprocessor applies row shift signals to the CCD array, and the oscillator applies column shift signals thereto. Under control of the shift signals, the signal content of the bottom row of the array is applied to a serial register, and the content of each row is shifted down one row. In this way, the content of each row is shifted down, a row at a time, until it is applied to the serial register, and thus the entire field or raster is read at, for example, a full scan rate of 100 Hz.

The serial output of the register is a series of analog pulses, which are applied to the analog-to-digital converter, where the analog signals are converted to a digital signal, which is applied to a video random access memory which stores the signals while the image is being scanned. The counter generates address information signals which are applied to the video RAM, which identify each word of the image as to location in row and column of the field. When the RAM is full or when all needed data has been acquired, it is switched, by means of a set/reset or activating/deactivating signal from the latch to the microprocessor data and address buses. The microprocessor analyzes the data from the RAM and, by means of the address signals, is able to fix precisely at what point in the frame or field the object under inspection is located. In order that precision is achieved, the fixed fiducial marks located at known points within the field enable the processor to locate the object relative to these points, which immediately gives its location. Further, if the object is moving relative to these reflective points, its direction and velocity relative thereto can be immediately and precisely determined.

Once the object is located within the field, it is only necessary, for subsequent pictures, to observe that portion of the field where the object is located, and the neighboring area, which, if the object is fixed can be quite small, or, if the object is moving, somewhat greater in area. The microprocessor, having determined the location of the object, sends a signal to the timer to accelerate the reading of the rows until the first row of the desired object neighborhood or area is reached, at which point the microprocessor signals the timer to return to normal speed or the speed necessary to read partial rows. The microprocessor also, having determined the number of columns included in the desired area, signals the timer to shift to the next row when the determined number of columns has been read. The system is so configured that the window containing the area in which the object lies can be, in effect, altered "on the fly" which is of special benefit in the tracking of moving objects. The process of utilizing and reading only a portion of the full frame can speed the process by as much as a factor of ten or more. Thus, where scanning the full raster is at a rate of 100 Hz, the partial rate can exceed 1000 Hz. This is of particular utility where tracking of small, moving objects or features is required of the system.

As a consequence of the foregoing picture taking process, the system is able to located objects within the field of view of the charge coupled devices and to track moving objects within the field. The data fed to the microprocessor is sufficient to enable it to determine what signals are to be generated from its analysis of the data, and, where applicable, these signals can be applied to a host computer for whatever steps are necessary or desirable to control, for example, the manufacturing process being monitored.

The microprocessor can also determine if more or less illumination is needed, based upon the data from the first frame read and control the length of time the illumination device is on for optimum illumination of subsequent frames.

The entire system of direct digitization and analysis of the invention may be contained in a single compact unit which may, if desired, contain a power supply such as a battery or batteries. Thus, the system is readily transportable to remote host computers, for example. Inasmuch as all components, including the illumination device, are in a single compact unit, there is no necessity for transporting various components of the system separately, as is typical of prior art devices.

The various features and advantages of the present system will be more readily apparent from the following detailed description, read in conjunction with the accompanying drawings.

BRIEF DESCRIPTION OF THE DRAWINGS

FIG. 2 is a block diagram of the system of the present invention;

DETAILED DESCRIPTION

Figure 1:
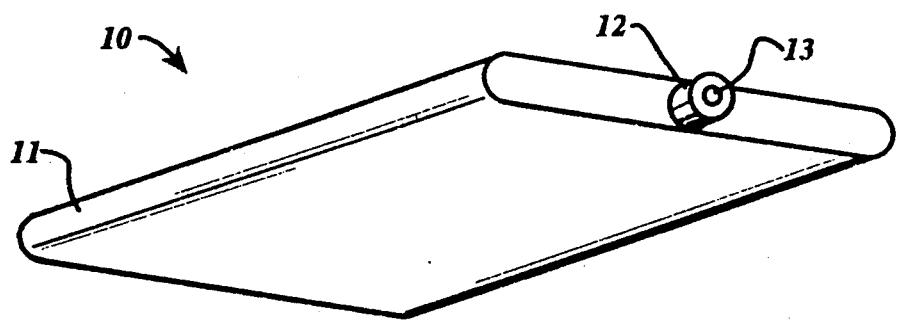
FIG. 1 is a perspective view of the computer camera system of the present invention.

In FIG. 1 there is shown the computer camera system 10 of the present invention as it appears in its actual form. The system is contained within a case 11 which preferably is made of a material of sufficient strength and durability. On one end of the case 11 is mounted a suitable illumination device 12 which may be, for example, a xenon flash tube, the duration or strength of the flash being controllable. Centered within the device 12 is an aperture 13, which may contain a suitable lens, or which may comprise a simple pin hole, for focusing the image of the object under scrutiny onto the raster of pixels, not shown. FIG. 1 demonstrates the simplicity and compactness of the camera system, inasmuch as the entire system exclusive of an external power supply, is contained in case 11. Only slight modification of the case 11 would be required to add on a portable power pack.

FIG. 2 is a block diagram of the camera system 10 of the present invention in, as will be apparent hereinafter, its picture taking configuration. The system 10 comprises the illumination unit 12 and the lens aperture 13 which is mounted on a camera 14 which comprises an array of charge coupled devices (CCD) in, for example, a 192×165 pixel array, upon which the illuminated object 16 under scrutiny is focussed by lens 13.

A microprocessor 17 is connected, through an address decoder 18 to a timer 19 and through another address decoder 21 to a latch 22. As will be apparent hereinafter, microprocessor 17 controls both the latch 22 and the timer 19, including the timing rate of the timer 19, which may be varied during operation. An oscillator 23 having, for example, a 16 MHz frequency has its output connected through leads 24 and 26 to the timer, and through lead 24 to the microprocessor 17. Oscillator 23 functions as a synchronizer for the entire system, being connected to those elements thereof whose operations are most desirably synchronized with each other.

Camera 14 is connected to the oscillator 23 via oscillator bus 27, and to the output of timer 19 via lead 28. Oscillator 23 may, for example, have a frequency of 16 MHz. Read out signals are applied to camera 13 by means of bus 27 and lead 28, lead 28 from timer 19 carrying row read-out signals and bus 27 from oscillator 23 carrying column read-out signals. As can be seen in FIG. 2, the read-out signals from camera 14 are applied to a serial register 29, the output of which is applied through lead 31 to an analog to digital converter 32.

Oscillator synchronizing signals are applied through bus 27 and lead 33 to converter 32, and also applied to converter 32 through lead 34 are set/reset signals from latch 22. The output of converter 32 is applied, to one pole 37 of a switch 38, which is connected to and controlled by set/reset signals from latch 22 via lead 39. The common pole 41 of switch 38 is connected to a video random access memory (RAM) 42. The other pole 43 of switch 38 is connected via data bus 44 to microprocessor 17. RAM 42 is also connected to switches 46 and 47, shown ganged together under control of set/reset signals from latch 22 via lead 48. One pole 49 of switch 46 is connected to oscillator 23 via bus 27 and lead 51. The other pole 52 of switch 46 is connected to microprocessor 17 via lead 53. The common pole 54 is connected to RAM 42. One pole 56 of switch 47 is connected via lead 57 to microprocessor 17 and the other pole 58 is connected to ground, while the common pole 59 is connected to RAM 42.

A counter 61 is connected to oscillator 23 via bus 27 and lead 62, and to latch 22 via lead 63. The output of counter 61 is connected to the pole 64 of a switch 66 controlled by latch 22 via lead 67. Common pole 68 of switch 66 is connected to RAM 42 and the other pole 69 is connected to microprocessor 17 via lead 71 which supplies address signals from microprocessor 17 to RAM 42 during read out. It is to be understood that most of the components under the control of latch 22 can be connected to a single set/reset bus from latch 22, however, the use of individual leads allows independent control of the various components, thus allowing for off-set set/reset signals where desired. Additionally, register 29 may be made a part of camera 14, and address decoders 18 and 21 can be incorporated within the timer and latch, respectively. Microprocessor 38 is shown with an output lead 72, which may serve to send processed information to a host computer (not shown), for example, or to some other component were such information can be utilized. Switches 38, 46, 47 and 66 have been shown as mechanical switches for purposes of illustration. Such switches generally are solid state devices which might, for example, be incorporated into their related devices, such as switch 38 being incorporated into RAM 42.

OPERATION

In taking a picture, which, as pointed out before, is not actually taking a picture but rather impressing varying light on an array of pixels forming a raster for generating electrical signals, the oscillator supplies synchronizing signals to the various components, and the microprocessor 17 activates latch 22, which immediately fires illumination device 12 to illuminate object 16 which is then focused on the array of pixels within camera 14. It is to be understood that the object 16 is located within the field of view of lens 13. Latch 22 then activates timer 19, which generates row reading signals for reading the electrical signal content of the pixel array while oscillator 23 supplies column reading signals. These reading signals read the pixels in the array by rows, and the content thereof is sequentially passed into serial register 29, the output of which is an analog pulse train applied to analog to digital converter 32. Converter 32 is enabled by a set signal from latch 22, which, at the same time, sets switch 38 so that the output of converter 32 is applied to video RAM 42. Switches 46 and 47 are also positioned as shown in FIG. 2, wherein RAM 42 receives synchronizing signals from oscillator 23, and pole 59 of switch 47 is connected to pole 58 and hence ground, which is the write position.

At the same time, switch 66 is positioned by latch 22 as shown, so that counting signals from counter 61, which was set by latch 22, are applied directly to RAM 42. Thus, the analog signals from register 29 are converted to an 8 bits per word digital pulse train which is applied to RAM 42 along with counting signals from counter 61. The counting signals serve to identify the words in the digital pulse train and locate them relative to the total field or raster. When the entire picture has been stored in RAM 42, latch 22 actuates switch 38 to connect the RAM 42 to the microprocessor 17 over data bus 44. At the same time, switches 46 and 47 are actuated so that the microprocessor sends a read signal over lead 57 to the RAM 42, concurrently a data and address validating signal is applied through switch 46 to RAM 42 via lead 53, and counter signals are removed from RAM 42 by switch 66 and address signals are applied to RAM 42 over lead 71 from the microprocessor. Thus, RAM 42 is connected to microprocessor 17, which now analyzes the information on data bus 44 from the RAM 42. The microprocessor is able to determine exactly where in the total field the object 16 appears.

In order that subsequent information may be obtained more quickly, without the necessity of converting, writing, storing and reading the entire field, the microprocessor 17 orders the system to scan or store and read only that portion or area of the field where the object 16 is contained. Thus, on the next picture after the first, the microprocessor 17 orders the timer 19 to speed up the raster row reading signal to the maximum speed electronically possible with the components and circuitry used, so that the information contained therein, which is of no interest is handled at a high rate of speed. The signals resulting from this high speed reading will be ignored by the microprocessor 17 during read-out. When the desired area of the raster, as determined by the microprocessor, is reached, the microprocessor 17 orders timer 19 to return to the normal scan rate, and also, in effect, controls how many columns to scan. Thus, when the desired number of columns have been scanned, timer 19 shifts to the next row, and scanning commences for that row. This "windowing" process increases the operation of the picture writing, reading, and analysis by as much as a factor of 10 or more.

Figure 3:
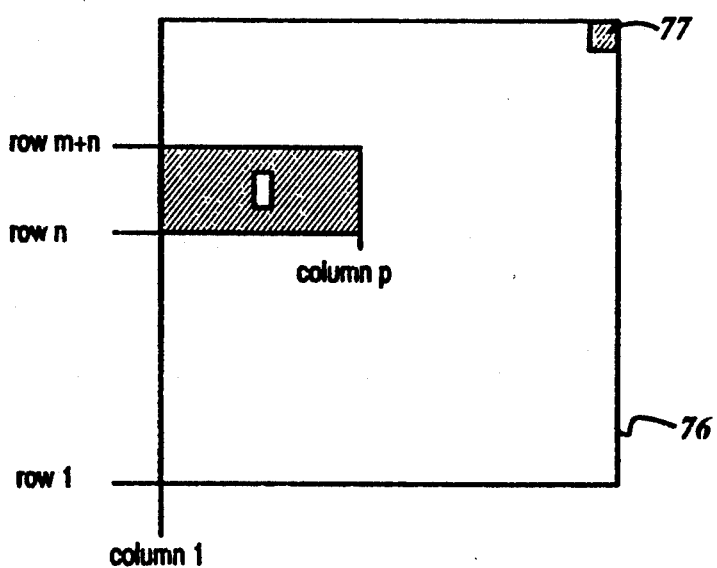
FIG. 3 is a diagrammatic view of the "windowing" action of the system of the invention.

The windowing process is illustrated in FIG. 3, which depicts an entire field or raster 76. For some applications, where, for example, it is desired to locate the object within the field with a high degree of precision a retroreflective locating element 77 may be located within the field. Although element 77 is shown in FIG. 3 as being in the upper right hand corner of the field, it, and other elements, may be located at locations within the field, and their location accurately determined by taking a picture and analyzing it in microprocessor 17. In the system 10 as shown in FIG. 1, such a preliminary step is quite useful in placing the case 11 and orienting the illuminating device 12 and lens 13. With the exact location of element 77 know and stored in the microprocessor 17, the location of object 16 can be quickly determined. In actuality, for locating object 16 using the method described in relation to FIG. 2, element 77 is not strictly necessary, and can be eliminated in that application.

After the first picture is taken, the microprocessor 17 determines that the object is located in an area defined by row n to row n+m, and column 1 to column p. It thereupon instructs the timer 19 to reel through rows 1 to n at a maximum rate of speed, to scan from row n to row n +m at a slower speed. In reading the area from row n to row n+m, as soon as column p has been reached, the timer shifts the row scan to the next row, and the column scan resets to column 1.

Figure 4:
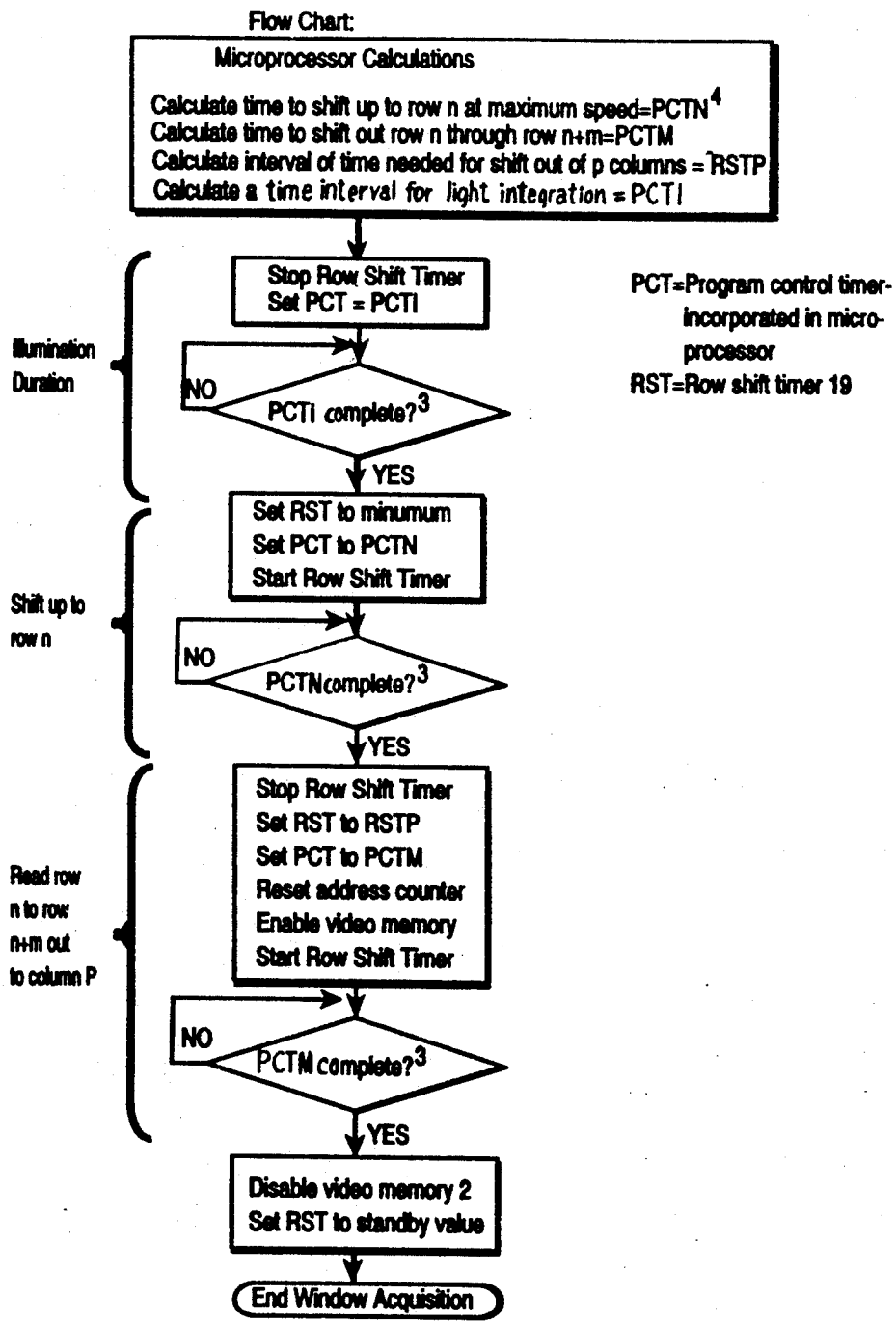
FIG. 4 is a flow diagram of the "windowing" action of the system of the invention.

In FIG. 4 there is shown a flow diagram for the windowing process where the microprocessor has analyzed the first frame and determined that the object 16 is located as shown in FIG. 3. The process, as depicted in FIG. 4, comprises a first phase where the illumination is integrated to insure proper exposure, under control of the microprocessor, a second phase wherein the rapid reading up to row n takes place, and a third phase where the predetermined area is read.

It can be seen that the system is capable of tracking moving objects as well as stationary objects, and ascertaining the velocity and direction of movement. In the event that an object moves out of the designated window, the microprocessor will command the system to take a full frame picture or a larger window in order to relocate the object. In addition, the use of charge coupled devices enables the system to operate with, for example, an eight bit gray scale, which materially enhances the accuracy of the system.

The features and principles of the present invention have been disclosed in an illustrative preferred embodiment thereof. Numerous changes and modifications may occur to workers in the art without departure from the spirit and scope of the invention.

We claim:

1. An image reading system comprising;
   an imaging array comprising rows and columns of light sensitive solid state elements;
   focusing means for focusing an image containing field of view onto said array;
   timer means for generating and applying row reading signals to said array;
   synchronizing means for applying column reading signals to said array;
   converter means for converting the read-out of said array to a digital signal and applying the digital signal to a storage device;
   counter means for applying address information signals to said storage device concurrently with the digital signal from said converter means for identifying and locating the digital signals relative to the total field focused on said array;
   a signal processor member;
   means for applying the stored signals in said storage device to said processor member for analyzing the read image and determining the location of an object or objects within the field, and identifying the particular area of the array in which the object is located, said processor member being adapted to alter the row reading rate of said timer means row reading signals to a first rate in those portions of the array outside the particular area, and to read only the partial rows defining the particular area after the first row of the particular area is reached during the reading process at a rate different from said first rate; and
   latch means for switching said storage device between a data receiving condition and a data output condition under control of said processor member, said latch means being adapted to actuate switching means to switch said storage device from a write mode wherein signals from said converter means are applied to said storage device to a read mode wherein data contained in said storage device is applied to said signal processing member.

2. An image reading system as claimed in claim 1 wherein said synchronizing means is adapted to supply synchronizing signals to said converter means.

3. An image reading system as claimed in claim 1 wherein said synchronizing means is adapted to supply synchronizing signals to said timer means.

4. An image reading system as claimed in claim 1 wherein said synchronizing means is adapted to supply synchronizing signals to said counter means.

5. An image reading system as claimed in claim 1 wherein said synchronizing means is adapted to supply synchronizing signals to said processor member.

6. An image reading system as claimed in claim 1 wherein said synchronizing means comprises an oscillator.

7. An image reading system as claimed in claim 1 wherein said latch means simultaneously actuates switching means for switching address information generated by said counter means from being applied to said storage device to address information applied to said processor member.

8. An image reading system as claimed in claim 1 and including illumination means, said latch means being adapted to turn said illumination means on to illuminate the field of view and to turn said illumination means off after the illuminated field of view has been focussed onto said array.

9. An image reading system for locating objects within a field of view comprising, in combination,
   a camera member comprising an array of rows and columns of light sensitive detecting devices and means for focusing a field of view onto said array,
   a processor device,
   a synchronizing means for applying synchronizing signals to said processor device,
   a latch means adapted to receive signals from said processor device for generating set signals and reset signals,
   an illuminating device for illuminating the field of view upon receiving an activating signal from said latch means, and for turning off a set device upon receipt of a deactivating signals from said latch means,
   a timer means for applying row shift signals to said array upon receipt of a set signal from said latch means for reading each row of said array, said synchronizing means being adapted to supply column reading signals to said array;
   a register means for receiving the electrical signals from each row as it is read and for producing a serial analog signal output,
   an analog to digital converter for receiving the analog signal output of said register means and converting it to a digital pulse train upon receipt of a set signal from said latch means,
   a random access memory device having a write mode and a read mode,
   first means under control of the signals from said latch means for placing said memory device in the write mode,
   second means under control of the signals from said latch means for applying the digital pulse train from said converter to said memory device in the write mode for storage therein,
   a counter means for generating address information signals upon receipt of an activating signal from said latch means,
   third means under control of the signals from said latch means for applying the address information signals from said counting means to said memory device in the write mode to identify each digital word of the digital pulse train as to location in the rows and columns of said array,
   said first means being adapted, upon receipt of a reset signal from said latch means, to connect said memory device to said processor device in a read mode,
   said second means being adapted, upon receipt of a reset signal from said latch means, to connect said memory device to said processor device in a data output mode,
   said third means being adapted, upon receipt of a reset signal from said latch means to connect address information signals from said processor device to said memory device,
   said processor device being adapted, upon receipt of the data and address information signals, to ascertain what portion of the field of view focussed on the array contains the object being located and to apply control signals to said timer means to cause that portion of the array that does not contain the object to be read at a first rate, and that portion of the array that contains the object to be read at a second rate.

10. An image reading system as claimed in claim 9 wherein said first rate is greater than said second rate.

11. An image reading system as claimed in claim 9 wherein said synchronizing means is an oscillator.

12. An image reading system as claimed in claim 9 wherein said second means comprises switch means for disconnecting said memory device from said converter and connecting said memory device to said processor device.

13. An image reading system as claimed in claim 9 where said third means comprises switch means for disconnecting the output of said counter means from said memory device and connecting an address output of said processor device to said memory device.

14. An image reading system as claimed in claim 9 wherein said synchronizing means is adapted to supply synchronizing signals to said timer means.

15. An image reading system as claimed in claim 14 wherein said synchronizing means is adapted to supply synchronizing signals to said converter.

16. An image reading system as claimed in claim 15 wherein said synchronizing signals to said memory device.

17. An image reading system as claimed in claim 16 wherein said synchronizing means is adapted to supply synchronizing signals to said counter means.

* * * * *